June 12, 1928.  1,673,423
M. RESWICK
SPEED INDICATOR
Filed May 16, 1927
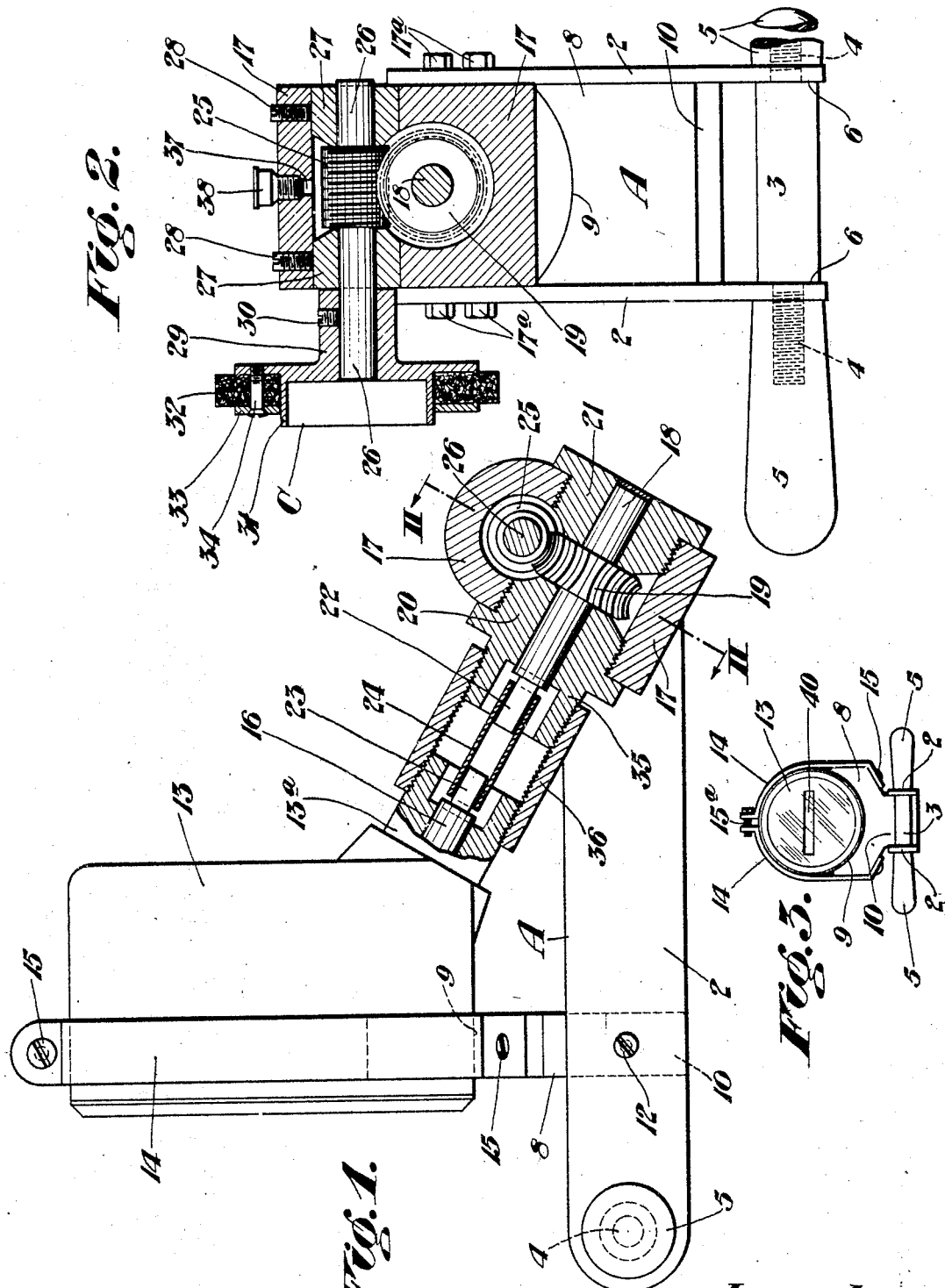
Witnesses:
Edwin Trueb
Inventor:
MAURICE RESWICK,
by: D Anthony Usina
his Attorney.

Patented June 12, 1928.

1,673,423

UNITED STATES PATENT OFFICE.

MAURICE RESWICK, OF ELLWOOD CITY, PENNSYLVANIA.

SPEED INDICATOR.

Application filed May 16, 1927. Serial No. 191,906.

This invention relates to speed indicators and, while not limited thereto, relates more particularly to speed indicators adapted to indicate the surface speed of emery wheels and similar devices.

One object of the present invention is to provide a speed indicator that will accurately indicate the surface speed of a rotating object instantaneously by mere contact of the instrument with the face of the object.

Another object is to provide an instrument of the class described, having a construction of sufficient strength to withstand the shocks and rough usage resulting from mill usage and when brought and held in contact with the rough surfaces of grindstones or emery wheels.

The usual method of obtaining the surface speed of an emery wheel or grindstone is to determine the number of revolutions of the shaft per minute by means of a revolution counter and then determine the diameter of the wheel and calculate the peripheral speed. This method, while absolutely accurate, involves more effort and arithmetic than the ordinary mill employee is willing to use regularly.

In view of the above, since it is desirable to know the surface speed of all emery wheels and grindstones at regular intervals for purposes of safety and also in order to insure maximum production, there has been a long felt desire for a speed indicator that would show the surface speed of emery wheels and grindstones instantaneously by mere contact of the instrument with their surfaces.

The indicator of this invention is of rugged construction, capable of withstanding the rough use to which it is subjected in indicating the surface speed of emery wheels and grindstones and answers all the requirements set forth above, besides having a relatively low initial cost.

In the drawings—

Figure 1 is a side elevation, partly in section, of an indicator constructed in accordance with this invention.

Figure 2 is a sectional view taken on the line II—II of Figure 1.

Figure 3 is a front side elevation of the apparatus.

Referring more particularly to the drawings, the letter A designates the base as a whole, which is composed of a pair of side bars 2 which are connected at their forward ends by a spacing bar 3 having handle supporting projections 4 projecting through the bars 2 and which are threaded to receive the handles 5. The portion of the bar 3 between the bars 2 is of greater diameter than the projecting ends 4 to form shoulders 6 and the bars 2 are clamped against the shoulders 6 by the handles 5.

An indicator support 8 having a concave seat portion 9 and a supporting leg portion 10 is adapted to be secured between the base bars 2 at a point intermediate their ends. The leg portion 10 of the support fits between the base bars 2 and serves as a spacer, and is secured thereto by bolts 12.

A standard surface speed indicator 13, such as a speedometer head like that commonly used on automobiles, is mounted on the seat portion 9 of the support 8 and held in position by straps 14 which extend around the indicator 13 and have their lower ends secured to support 8 by bolts 15 and their upper ends secured together by bolt 15$^a$.

The speed indicator 13 has the usual threaded boss 13$^a$ projecting on an angle from the rear thereof in which is journaled a drive shaft 16.

A worm and worm-wheel casing 17 is mounted between the side bars 2 at the rear end of the base and secured in position by bolts 17$^a$. A worm-wheel shaft 18 having a worm-wheel 19 thereon is mounted in the casing 17 and the shaft 18 is journaled in removable bearing bushings 20 and 21, threaded into the casing 17.

The shaft 18 has its one end provided with a squared extension 22 and the drive shaft 16 of the speed indicator has a similar extension 23 and a coupling member 24 is slidably mounted on the shaft extensions 22 and 23 to form a removable coupling.

A worm 25 and worm-wheel shaft 26 are formed integral and mounted in the casing 17 with the worm 25 in mesh with the worm-wheel 19. The shaft 26 is journaled in removable bearing bushings 27 mounted in the casing 17 and locked in position by set screws 28.

The shaft 26 has its one end extended to receive a friction drive wheel C composed of a combined side disk and hub member 29 which is locked on the shaft 26 by a set screw 30. The disk portion of the member 29 is provided with a flange 31 adapted to support a rawhide, fabric, fiber or other friction rim 32. A clamping ring 33 is mounted on the flange 31 and secured to the disk portion of the member 29 by screws or bolts 34 so as to securely clamp the rim 32 in position.

The bushing bearing 20 has its outer end extended as at 35 to house the squared extension 22 of the shaft 18 and a sleeve 36 is threaded on the extension 35 and the boss 13ª of the indicator so as to form a rigid connection and support between the housing of the speed indicator and the worm and worm-wheel casing.

The worm and worm-wheel casing 17 is provided with an opening 37 normally closed by a cap 38 and through which lubricant is adapted to be admitted to the worm and worm-wheel.

In operation it is only necessary to move the apparatus of this invention toward the peripheral surface of the emery wheel or grindstone, whose speed is desired, until the drive wheel C contacts with the peripheral surface of the emery wheel which will immediately cause the wheel C to rotate and operate the speed indicating mechanism which will indicate on its face by the indicia shown at 40, the surface speed of the wheel being gaged in feet per minute.

While I have shown and described one specific embodiment of my invention it will be understood that I do not wish to be limited thereto since various modifications may be made without departing from the scope of my invention, as defined in the appended claim.

I claim:—

A portable surface speed indicator for emery wheels and the like, comprising, in combination, a base, handles projecting from each side of said base, a worm and worm-wheel casing carried by said base, a worm-wheel and worm-wheel shaft mounted in said casing, an integral worm and worm-shaft mounted in said casing, said worm being meshed with said worm-wheel, a driving wheel on said worm-shaft, a standard speed indicator secured to said base and having a drive shaft projecting therefrom, means forming a rigid detachable supporting connection between said speed indicator and said worm and worm-wheel casing, a squared end on said indicator drive shaft, a squared driving end on said worm-wheel shaft, and a squared coupling sleeve member slidably and removably mounted on said squared ends of said drive shaft and said worm-wheel shaft, forming a detachable coupling between said shafts.

In witness whereof, I have hereunto signed my name.

MAURICE RESWICK.